United States Patent [19]

Volk, Jr.

[11] 4,342,361
[45] Aug. 3, 1982

[54] HEAT EXCHANGER FOR PELLET MILL

[75] Inventor: Joseph A. Volk, Jr., Florissant, Mo.

[73] Assignee: Beta Corporation of St. Louis, Bridgeton, Mo.

[21] Appl. No.: 196,436

[22] Filed: Oct. 14, 1980

[51] Int. Cl.³ .............................................. F22B 1/02
[52] U.S. Cl. ...................................... 165/113; 99/487
[58] Field of Search .................. 99/487; 165/111, 112, 165/113

[56] References Cited

U.S. PATENT DOCUMENTS

| 1,046,303 | 12/1912 | Josse et al. | 165/112 |
| 2,069,653 | 2/1937 | Hösel | 165/113 |
| 2,476,477 | 7/1949 | Berg | 165/111 |
| 2,601,971 | 7/1952 | Todd | 165/111 |
| 2,756,028 | 7/1956 | Byerley | 165/113 |
| 3,932,736 | 1/1976 | Zarow et al. | 99/487 |
| 3,938,588 | 2/1976 | Coit et al. | 165/113 |
| 4,183,675 | 1/1980 | Zarow | 366/144 |

FOREIGN PATENT DOCUMENTS

| 199144 | 1/1907 | Fed. Rep. of Germany | 165/111 |
| 190801 | 12/1922 | United Kingdom | 165/112 |

Primary Examiner—Sheldon J. Richter
Attorney, Agent, or Firm—Rogers, Eilers & Howell

[57] ABSTRACT

A heat exchanger for use in the production of pellets, such as in a feed pellet mill, where both steam and water are used in a conditioner to condition milled material before pelleting. The heat exchanger has a steam inlet for delivery of steam to the chamber from a steam supply and a steam outlet for delivery of steam to the conditioner. A portion of the chamber defines a collector for the collection of condensate and has a second outlet for the delivery of the condensate from the chamber back to the steam supply. A coil surrounds at least a portion of the chamber to provide heat exchange between the chamber and the coil so that water passing through the coil is heated by the heat exchange from said chamber for delivery to the conditioner.

21 Claims, 1 Drawing Figure

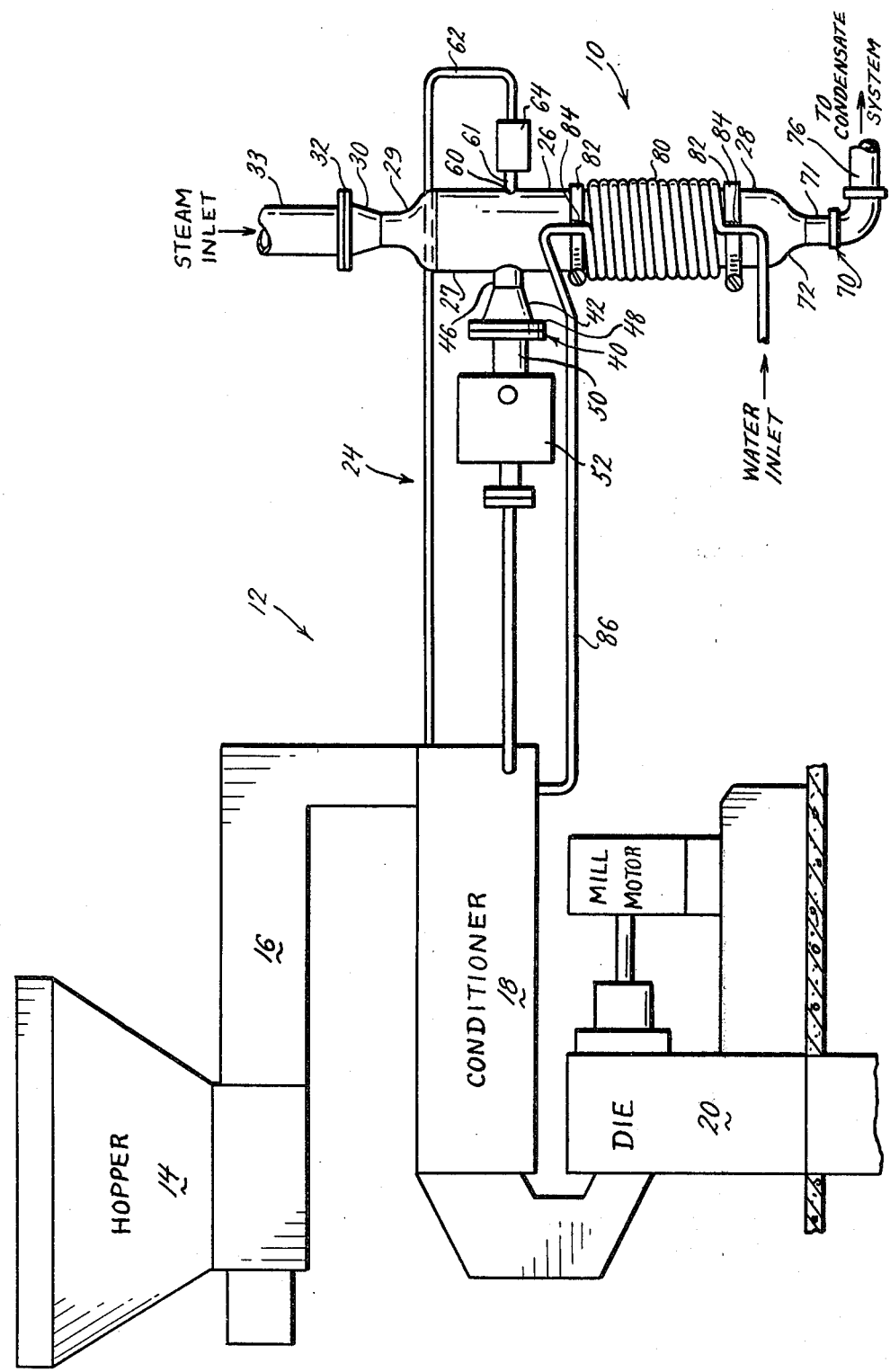

HEAT EXCHANGER FOR PELLET MILL

BACKGROUND AND SUMMARY OF THE INVENTION

This invention relates to apparatus for use in the production of pellets, such as in a feed pellet mill, and more particularly an apparatus for use in the production of steam and heated water in such a mill.

Typically, a pellet mill has a conditioner, sometimes referred to as a mixer/conditioner, where a selected milled material is conditioned by the addition of heat and/or moisture before it enters the mill die for the production of feed pellets. Steam and heated water have long been used for this purpose. An explanation of the conditioner, and the use of steam and water to condition the milled material, are fully set forth in U.S. Pat. Nos. 3,573,924, 3,932,736, and 4,183,675, the entirities of which are hereby incorporated herein by reference. U.S. Pat. No. 4,183,675 discloses one method and apparatus for generating steam and heated water in a feed pellet mill where a separate steam jacketed heat exchanger is used in the generation of the heated water.

The present invention represents an improvement in heat exchange apparatus for use in the production of pellets, such as in a feed pellet mill, which is very easy and convenient to use and relatively inexpensive, and where the heat exchanger for producing heated water also functions as a steam drop out chamber in the steam generating circuit.

Steam drop out chambers have long been used in the production of steam in a feed pellet mill. One such chamber, or separator, is shown by the reference 66 in FIG. 1 of referenced U.S. Pat. No. 3,932,736. These chambers have generally comprised a generally vertically oriented, cylindrical chamber with a steam inlet at the top, and a steam outlet in the side of the chamber and at right angles to the steam inlet. The portion of the chamber beneath the steam outlet defines a collector for collecting condensate from the steam so that the steam fed from the steam outlet to the conditioner is relatively dry. Another outlet is provided at the lower end of the chamber to feed the collected condensate back to a steam supply. Such drop out chambers have typically been designed with the diameter of the chamber substantially greater than that of the inlet and outlets to aid in separating the condensate out of the steam.

The present invention makes use of this drop out chamber, which typically exists in the circuit for the production of steam to the conditioner of the pellet mill, as also a heat exchanger in the production of heated water for use in the conditioner, such as to add moisture to the milled material.

In accordance with the present invention, a coil, such as of copper, is wound around the outside of the chamber and preferably around about that portion of the chamber beneath the steam outlet defining the trap. The coil is adjustably secured to the chamber so that it may be fastened tightly thereagainst for good heat exchange between the chamber and coil. Water fed through the coil is heated by heat exchange from the chamber, and thereafter fed to the conditioner for conditioning the milled material as desired.

The result is a relatively inexpensive means for producing both steam and heated water for use in a pellet mill, and where the heat exchanger functions not only to produce the heated water, but also as a drop out chamber in the production of steam, thus eliminating the need for a separate steam jacketed heat exchanger for the production of heated water.

These and other objects and advantages of the invention are apparent from the drawing and detailed description to follow.

DESCRIPTION OF THE DRAWING

The drawing is a schematic of a typical feed pellet mill including the heat exchanger of this invention.

DETAILED DESCRIPTION OF A PREFERRED EMBODIMENT

With reference to the drawing, there is shown a heat exchanger 10 for use in the production of pellets, such as in a feed pellet mill, or pellet producing system 12. The system generally includes a hopper 14 into which a selected milled material is placed, and a screw feeder 16 for feeding the material into a conditioner 18. At the conditioner 18, the material is conditioned, such as by the addition of heat and moisture, and thereafter fed to the mill die 20 for the production of feed pellets. The system includes various controls (not shown) such as for the control of the amount of milled material fed to the die, the heat and moisture content of the material before it is fed to the die, and other controls disclosed and described in said referenced patents.

The pellet mill 12 also includes a system 24, of which the heat exchanger 10 is a part, for the production of steam and heated water for use in the conditioner to condition the milled material before entering the die. Thus, the heat exchanger 10 has a cylindrical chamber 26, which is generally elongated and vertically oriented as shown in the drawing. The chamber includes a T-section 27 and pipe section 28 at the lower end thereof. At the top of the chamber is a reducer section 29 providing a smooth transition between the larger diameter chamber, and a smaller diameter steam inlet section 30. A flange 32 at the steam inlet is for mounting the upper end of the heat exchanger to an inlet steam supply pipe 33 from a suitable steam supply (not shown).

The chamber 26 has a steam outlet 40 at right angles to the steam inlet and communicating with the chamber through a tapered section 42 similar to the section 30, and a connecting nipple 46 of a diameter substantially less than that of the chamber. The steam outlet 40 also has a flange 48 for connection of a suitable conduit 50 for feeding steam from the chamber to the conditioner through a suitable steam modulator valve 52. The modulator valve 52 may be of the type described in referenced U.S. Pat. No. 3,932,736, and identified by the reference 57 in FIG. 1 of that patent.

The chamber 26 has another steam outlet 60 which is a relatively small orifice in the side of the chamber, also at right angles to the inlet, and which is connected by a nipple 61 and conduit 62 of relatively small diameter, through a solenoid valve 64 back to the screw feeder for input of the conditioner to heat and moisten the fines which are produced in the pelleting process and which are fed back to the screw feeder for repelleting. This requires only a small amount of steam and, therefore, the outlet 60 is of substantially smaller diameter than the outlet 40.

Another outlet 70 is located at the bottom of the chamber and communicates with the chamber through a nipple 71 and a reducer section 72 which may be similar to the input reducer 29 and which provides a diameter reduction from that of the chamber to that of the outlet 70. The diameter of the outlet 70 is substantially less than that of the chamber.

The outlet 70 is connected through a suitable conduit 76 to carry condensate from the steam back to the steam supply. Various controls may be included for safety and to regulate the flow of condensate from the chamber back to the steam supply.

It will be noted that the steam outlets 40 and 60 are preferably located somewhat above the center of the chamber 26, the portion of the chamber beneath the steam outlet 40 defining a collector for condensate from the steam entering the top of the chamber.

A coil 80, preferably of copper, is wound around the lower portion of the chamber defining the collector. Thus, preferably, all of the coil is located beneath the steam outlets 40 and 60. Clamps 82, which may be stainless steel, serrated, screw type hose clamps, are located at each end of the coil, with the ends of the coils attached thereto such as by brasing at the locations 84. The clamps provide both a convenient means for securing the ends of the coil, and a convenient means for tightening the coil into firm contact with the outer wall of the chamber. By loosening one or both of the clamps 82, the clamps can be rotated about the longitudinal axis of the chamber (the upper end rotated to the right and the lower end to the left as viewed in the drawing) to tighten the coil against the chamber wall, and thus provide good heat exchange contact between the coil and the wall of the chamber. When properly positioned, the clamps are then tightened to hold the coil firmly in place.

One end of the coil, preferably the lower end, defines a water inlet which is connected to a suitable pressurized cold water source. The other end, preferably the upper end, defines a hot water outlet for connection through a suitable conduit 86 to the conditioner.

By way of example, the chamber may be four inches, in diameter and 16 inches (40.64 cm) long for the combined lengths of the T- and pipe sections 27 and 28. The diameter of the inlet at the small end of the reducer section 29 may be two inches, (5.08 cm), the diameter of the steam outlet at the location of the nipple 46 may be two inches (5.08 cm), and the outlet 70 at the bottom of the chamber may be one inch (2.54 cm). The outlet 60 may be ¼ inch (0.635 cm), and the coil 80 may be ⅜ inch (0.9525 cm).

There should be a sufficient number of windings of the coil 80 such that water at 72° F. (22° C.) fed into the lower end of the coil, produces water at 212° F. (100° C.) at the coil outlet, with steam at 212° F. (100° C.) and 15 psi (1055 grams per square cm) fed to the input of the heat exchanger.

The operation of the heat exchanger is evident from the foregoing description. Steam from the steam supply enters the inlet of the chamber, turns 90° and exits at the steam outlet, whereupon it is fed to the conditioner for use in conditioning the milled material. Much of the water contained in the steam, drops to the bottom of the chamber whereupon it is fed back to the steam supply. It is believed that the separation of the water from the steam is aided by the diameter of the chamber being substantially greater than that of the steam inlet so that the velocity of the steam is reduced upon entering the chamber. Water separation is also believed to be aided by the configuration of the heat exchanger providing a right angle path for the steam and a straight descending path for the condensate.

As water enters the lower end of the coil 80, it becomes heated by heat transfer from the chamber, and the heated water is then fed to the conditioner for conditioning the milled material. The coil surrounds the collector portion of the chamber, rather than surrounding that portion of the chamber above the steam outlets, to prevent the cooler water in the coil from producing condensation in the upper portion of the chamber.

Thus, there has been described a heat exchanger that is relatively inexpensive, and easy to construct and use, and one which not only produces heated water for conditioning the milled material, but also acts as a drop out chamber, or separator, in the production of steam for conditioning the material.

There are various changes and modifications which may be made to applicant's invention as would be apparent to those skilled in the art. However, any of these changes or modifications are included in the teaching of applicant's disclosure and he intends that his invention be limited only by the scope of the claims appended hereto.

I claim:

1. A heat exchanger for use in the production of pellets where both steam and water are used in a conditioner to condition milled material before pelleting, said heat exchanger comprising an elongated chamber for generally vertical orientation, said chamber having a steam inlet at the upper end thereof for the delivery of steam to said chamber from a steam supply and a steam outlet at right angles to said steam inlet for delivery of steam to said conditioner, a portion of said chamber beneath said steam outlet defining a trap for the collection of condensate, a second outlet beneath said steam outlet for the delivery of said condensate from said chamber to said steam supply, and a coil surrounding at least a portion of said chamber for heat exchange therebetween, whereby water passing through said coil is heated by the heat exchange from said chamber for delivery to said conditioner.

2. The heat exchanger of claim 1 wherein said second outlet is at the bottom of said chamber.

3. The heat exchanger of claim 1 wherein said coil is in direct contact with the wall of said chamber.

4. The heat exchanger of claim 1 further comprising adjustable securing means for securing said coil in engagement with the wall of said chamber.

5. The heat exchanger of claim 4 wherein said adjustable securing means includes a clamp located near an end of said coil to which said coil is attached.

6. The heat exchanger of claim 1 wherein said chamber is generally cylindrical.

7. The heat exchanger of claim 6 wherein the diameter of said chamber is substantially greater than the diameter of the chamber inlet.

8. The heat exchanger of claim 1 wherein said coil is copper.

9. The heat exchanger of claim 1 wherein said coil is in direct contact with the wall of said chamber.

10. The heat exchanger of claim 1 further comprising adjustable securing means for securing said coil in engagement with the wall of said chamber.

11. The heat exchanger of claim 10 wherein said adjustable securing means includes a clamp located near an end of said coil to which said coil is attached.

12. The heat exchanger of claim 1 wherein said chamber is generally cylindrical.

13. The heat exchanger of claim 12 wherein the diameter of said chamber is substantially greater than the diameter of the chamber inlet.

14. The heat exchanger of claim 1 wherein said coil is copper.

15. A heat exchanger for use in the production of pellets where both steam and water are used in a conditioner to condition milled material before pelleting, said heat exchanger comprising a chamber having a steam inlet for the delivery of steam to said chamber from a steam supply and a steam outlet for delivery of steam to said conditioner, a portion of said chamber defining a trap for the collection of condensate, a second outlet for the delivery of said condensate from said chamber to said steam supply, and a coil surrounding said chamber for heat exchange therebetween, said coil being in direct contact with the wall of said chamber and at least the majority of said coil surrounding said chamber beneath said steam outlet, whereby water passing through said coil is heated by the heat exchange from said chamber for delivery to said conditioner.

16. The heat exchanger of claim 15 wherein the entirety of said coil surrounds said chamber beneath said steam outlet.

17. A heat exchanger for use in the production of pellets where both steam and water are used in a conditioner to condition milled material before pelleting, said heat exchanger comprising an elongated cylindrical chamber for generally vertical orientation and having a steam inlet at the upper end thereof of substantially smaller diameter than that of said chamber for the delivery of steam to said chamber from a steam supply, and a steam outlet at right angles thereto in the side of said chamber for delivery of steam to said conditioner, a portion of said chamber beneath said outlet defining a collector for the collection of condensate, a second outlet beneath said steam outlet and near the bottom of said chamber for the delivery of said condensate from said chamber to said steam supply, and a coil, at least a portion of which surrounds said chamber beneath said steam outlet for heat exchange therebetween, said coil being in direct contact with the wall of said chamber, whereby water passing through said coil is heated by the heat exchange from said chamber for delivery to said conditioner.

18. The heat exchanger of claim 17 wherein said coil surrounds said chamber only beneath said steam outlet.

19. The heat exchanger of claim 17 further comprising adjustable securing means for securing said coil in engagement with the wall of said chamber.

20. The heat exchanger of claim 19 wherein said adjustable securing means are clamps located near the ends of said coil to which said coil is attached, said clamps having means for loosening same for rotational adjustment relative the longitudinal axis of said chamber and for tightening same in a selected rotational position, whereby relative rotational adjustment of said clamps tightens said coil into close contact with the wall of said chamber.

21. The heat exchanger of claim 20 wherein said coil surrounds said chamber only beneath said steam outlet.

* * * * *